United States Patent [19]
Parker et al.

[11] Patent Number: 4,884,665
[45] Date of Patent: Dec. 5, 1989

[54] AUTOMOTIVE SHOCK ABSORBER WITH UNITARY STRIKER PLATE AND CLOSURE CAP

[75] Inventors: William A. Parker, Manchester; Thomas E. Bartos, Woodhaven; William M. Stewart, Livonia, all of Mich.

[73] Assignee: Ford Motor Company, Dearborn, Mich.

[21] Appl. No.: 816,584

[22] Filed: Dec. 24, 1985

[51] Int. Cl.⁴ .............. F16F 9/36; B23P 11/02; F01B 11/02; B65D 6/34
[52] U.S. Cl. .................. 188/322.17; 29/446; 29/520; 92/169.1; 188/322.19; 220/67
[58] Field of Search ........... 188/311, 315, 322.11, 188/322.16, 322.17, 322.19; 267/8 R, 20 A, 116, 120, 217; 92/165 R, 169; 29/520, 446; 280/668; 220/66, 67

[56] References Cited

U.S. PATENT DOCUMENTS

| | | | |
|---|---|---|---|
| 1,656,222 | 1/1928 | Oakley | 29/DIG. 43 |
| 3,314,276 | 4/1967 | Peyton et al. | 72/370 |
| 3,771,629 | 11/1973 | Fader et al. | 188/322.17 |
| 4,003,454 | 1/1977 | Wossner | 188/322.22 |
| 4,126,920 | 11/1978 | Takahashi et al. | 29/520 X |
| 4,335,871 | 6/1982 | Molders | 188/322.21 |
| 4,397,452 | 8/1983 | Fouts | 188/322.11 X |
| 4,480,730 | 11/1984 | Koller et al. | 188/315 |
| 4,542,811 | 9/1985 | Miura | 188/322.17 |

FOREIGN PATENT DOCUMENTS

| | | | |
|---|---|---|---|
| 2404111 | 8/1974 | Fed. Rep. of Germany | 188/322.17 |
| 2454562 | 12/1980 | France | 188/322.17 |
| 1203435 | 8/1970 | United Kingdom | 188/322.17 |
| 2099956 | 12/1981 | United Kingdom | |

Primary Examiner—Robert J. Oberleitner
Attorney, Agent, or Firm—Jerome R. Drouillard; Roger L. May

[57] ABSTRACT

An automotive shock absorber including a working cylinder, an outer cylinder mounted coaxially about the working cylinder, a piston rod attached to a piston slidably carried within the working cylinder, and a rod guide engaged with the outer cylinder for locating the piston rod coaxiallyl with the working and outer cylinders includes a unitary striker plate for maintaining engagement of the rod guide with the outer cylinder, wherein the striker plate comprises an annular ring formed from the outer cylinder and extending radially inwardly from the outer periphery of the outer cylinder with the annular ring having a U-shaped cross section oriented such that the legs of the U-shaped section lie generally perpendicular to the axis of the outer cylinder.

12 Claims, 4 Drawing Sheets

U.S. Patent    Dec. 5, 1989    Sheet 1 of 4    4,884,665
FIG.1
PRIOR ART
FIG.2
PRIOR ART
FIG.8
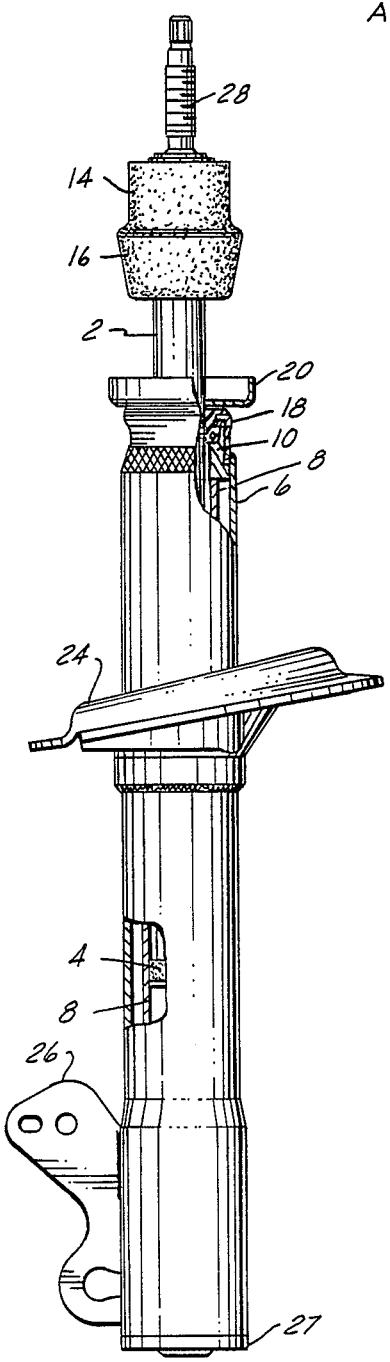
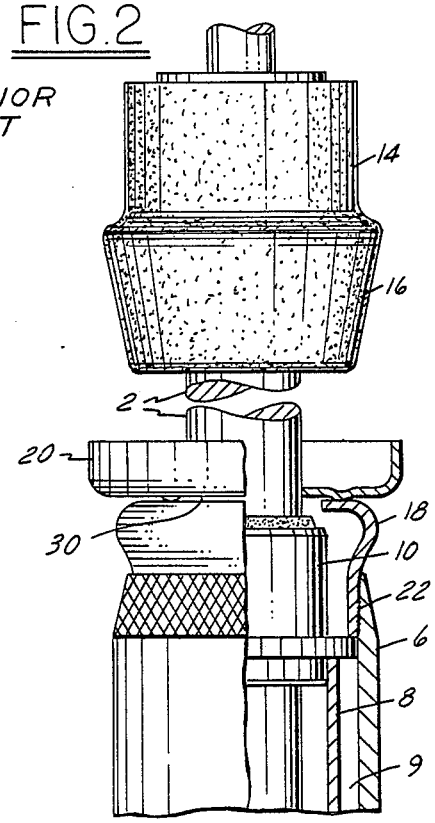
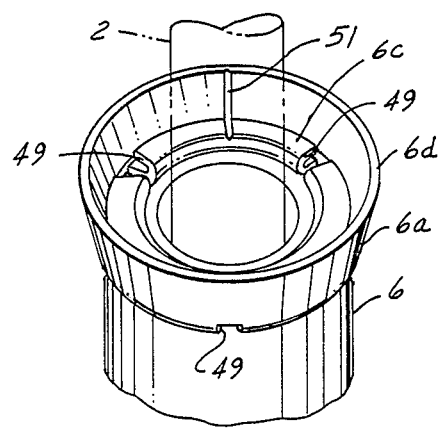

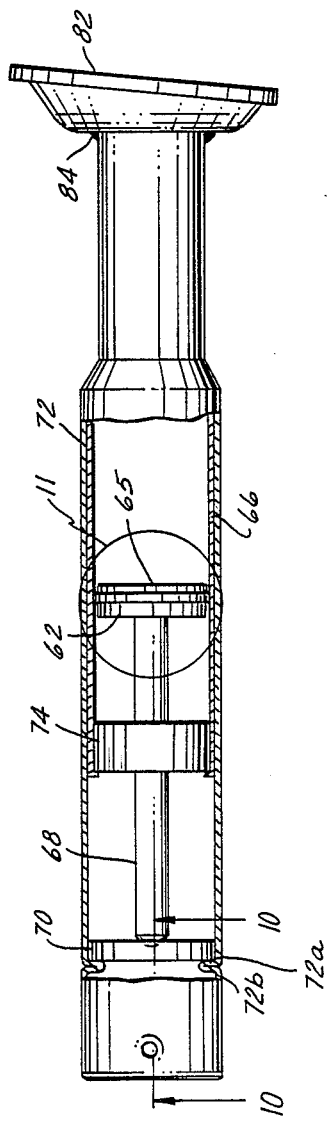
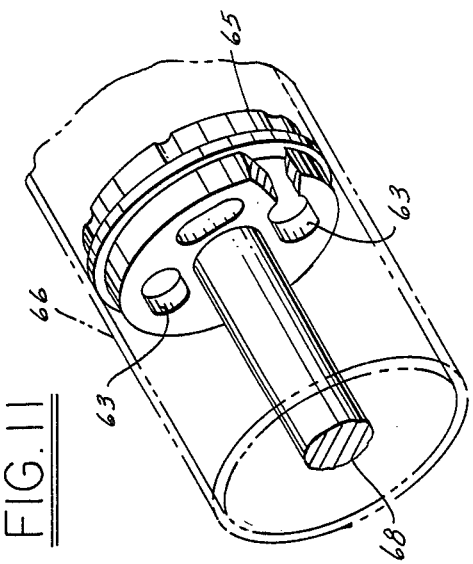
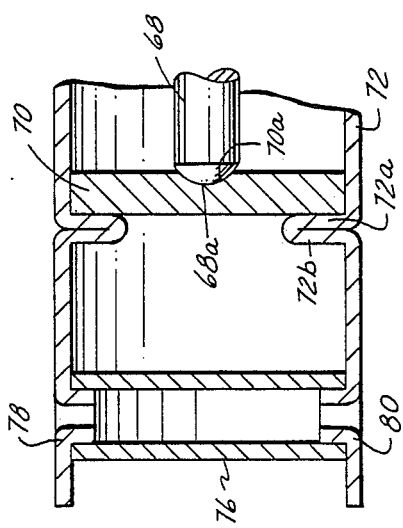

AUTOMOTIVE SHOCK ABSORBER WITH UNITARY STRIKER PLATE AND CLOSURE CAP

BACKGROUND OF THE INVENTION

1. Field of the Invention

This invention relates to an automotive shock absorber having a unitary striker plate and closure cap which is formed from the outer cylinder of the shock absorber and to a method of manufacturing same.

2. Disclosure Information

Various means and methods have been used for closing the outer cylinders of automotive shock absorbers in the area of the rod guide, which guide permits the shock absorber's piston rod to be coaxially supported and slidingly received within the main body of the shock absorber.

British patent application No. 2,099,956 and U.S. Pat. No. 4,335,871 disclose shock absorbers including an outer cylinder which is rolled over or spun down upon the shock absorber's rod guide. This method of closing a shock absorber presents certain drawbacks for mass production systems intended to produce shock absorber units suitable for use in MacPherson struts. First, because MacPherson struts are subjected to severe rebound shock loading when the strut is fully extended, the material of the outer cylinder and the single thickness spun over section must have sufficient strength to prevent the rod guide from becoming disengaged with the outer cylinder. However, spinning a heavy section having sufficient thickness to withstand the force upon full extension of the shock absorber will not be practicable because heat generated during the spinning process would damage the seals located in the rod guide; alternatively, the rod guide would need to be cooled during the spinning process and this would add undesirable complexity to the production process. Secondly, the inner radius of the bend in a spinning process must be roughly equal to the thickness of the metal being spun and radii of the magnitude which would result from spinning a heavy gauge cylinder would cause problems with gas seals, which would not have a square corner to seat onto. Another problem with spun-over closure systems is that no striker is provided for a jounce bumped mounted upon the piston rod. If such a striker is required, an additional striker plate must be welded onto the closed cylinder and such welding of an additional part may further damage the rod seal while at the same time engendering additional cost and production time.

Although it would be possible to form a closure having a configuration similar to those disclosed in British patent application No. 2,099,956 or U.S. Pat. No. 4,335,871, from a single stroke pressing operation, material of an outer cylinder having sufficient thickness to withstand the axial stresses encountered in such a pressing operation without failing through a buckling mechanism would be so heavy as to produce an uneconomical part in terms of cost and weight.

U.S. Pat. No. 4,480,730 discloses a shock absorber having a closure cap which is crimped to the outer cylinder. This of course necessitates the additional parts comprising the closure cap, which must be installed by means of a unique operation. This system is therefore not subject to the most favorable economics for mass production.

U.S. Pat. No. 4,003,454 discloses an automotive impact shock absorber for use with a bumper system of a motor vehicle in which an interior rod guide is welded to a supporting cylinder.

U.S. Pat. No. 1,656,222 and 3,314,276 disclose in the first case a flared supply pipe and in the second case a bellows formed from a pipe or tube section. In each case, the flared or bellows section extends externally from the cylinder from which it is formed. No internally extending section is disclosed.

It is an object of the present invention to provide an automotive shock absorber having a closure means which is economical in terms of material usage and production time.

It is a further object of the present invention to provide a shock absorber having a closure system which is economical because the shock absorber is closed by a closure cap and striker plate which is unitary with and formed from the outer cylinder of the shock absorber.

It is yet a further object of the present invention to provide an automotive shock absorber having an integral striker plate which may be formed and installed without damaging the piston rod guide seals of the shock absorber.

It is yet a further object of the present invention to provide a method for forming an integral closure cap and striker plate from the outer cylinder of an automotive shock absorber using multiple steps which result in a striker plate having sufficient strength for use with a MacPherson strut formed using an outer cylinder with a wall thickness which could not withstand in a single step the axial compression required to close the cylinder by means of a pressing operation.

It is yet a further object of the present invention to provide a method for assembling automotive shock absorbers without harmful welding processes.

It is yet a further object of the present invention to provide a method for assembling automotive shock absorbers which provides precise control of the length of the shock absorber's outer cylinder and striker plate.

SUMMARY OF THE DISCLOSURE

An automotive shock absorber comprises a working cylinder, an outer cylinder mounted coaxially about the working cylinder, a piston rod attached to a piston slidably carried within the working cylinder, a rod guide engaged with the outer cylinder for locating the piston rod coaxially with the working and outer cylinders, and a unitary closure cap for maintaining engagement of the rod guide with the outer cylinder. The closure cap comprises an annular ring formed from the outer cylinder and extending radially inwardly from the outer periphery of the outer cylinder, with the annular ring having a U-shaped cross section oriented such that the legs of the U-shaped section lie generally perpendicular to the axis of the outer cylinder with the bight of the U-shaped section defining the innermost radius of the annular ring. The closure cap may further comprise a striker plate for a jounce bumper mounted about the piston rod.

The outer cylinder may define an annular fluid reservoir with an inner cylinder of the shock absorber.

The unitary closure cap and striker plate of the present invention may be used with a shock absorber having a rod guide fitted at least partially within and engaged with a working cylinder as well as with the outer cylinder and having a bore therethrough for allowing passage of the piston rod.

When the integral closure cap of the present invention is used with a MacPherson strut including a jounce bumper mounted upon the piston rod, the unitary closure cap will preferably further comprise a generally cylindrical striker plate surface extending from the annular ring formed of the outer cylinder for contacting the jounce bumper when the shock absorber is in the full jounce position. This generally cylindrical section may preferably comprise a frustoconical shape with the least diameter of the frusoconical element adjoining the annular ring.

The method of the present invention for forming a unitary closure cap and striker plate from the outer cylinder of an automotive shock absorber comprises the steps of radially displacing inwardly at least two axially adjoining segments of the outer cylinder and axially compressing the radially displaced segments such that the segments abut each other to form an annular ring having a U-shaped cross section with the annular ring extending radially inwardly from the outer periphery of the outer cylinder and abutting the rod guide.

The method according to the present invention is preferably practiced by displacing the axially adjoining segments initially such that an obtuse angle is included between the segments.

According to the method of the present invention an additional segment of the outer cylinder adjoining the annular ring may be flared following axial compression so as to provide a striker plate surface for contacting the jounce bumper carried upon the piston rod. This flared segment also serves as an accurately formed metal stop for governing wheel travel in the upward or jounce position. The method according to the present invention may also include the step of piercing one or more apertures through the outer cylinder in such an axial position that such apertures are positioned at the bight of the U-shaped annular ring after the axially adjoining segments have been axially compressed.

BRIEF DESCRIPTION OF THE DRAWINGS

FIG. 1 is an elevation of an automotive shock absorber, in this case a MacPherson strut type shock absorber, partially cut away, which has been constructed in according to previously known methods.

FIG. 2 is an enlarged portion of the shock absorber of FIG. 1 showing the rod guide, closure cap, striker plate, jounce bumper, and other parts in greater detail.

FIG. 8 is a perspective view of the top of a shock absorber showing a unitary closure cap and striker plate according to the present invention.

FIG. 9 is an elevation, partially in section, of a shock absorber suitable for use with an automotive bumper system.

FIG. 10 is a enlarged sectional view of the bumper shock absorber of FIG. 9 taken along the line 10—10 of FIG. 9.

FIG. 11 is a perspective view of the shock absorber of FIG. 9 taken from circle 11 of FIG. 9.

DESCRIPTION OF THE PREFERRED EMBODIMENTS

Figure 3:
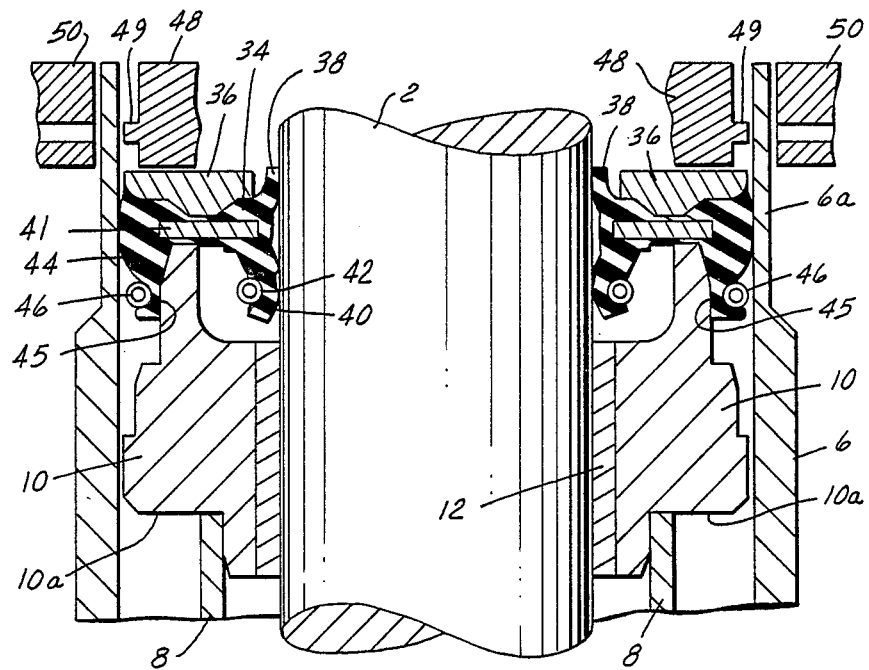
FIGS. 3–7 show a cross section of a shock absorber as a unitary closure cap and striker plate is being formed according to the method of the present invention.

In the prior art shown in FIGS. 1 and 2, a conventional automotive shock absorber, in this case, a MacPherson strut, includes a piston rod 2 upon which piston 4, is fixed. Piston rod 2 is received by rod guide 10 which is engaged with working cylinder 8 and outer cylinder 6. An annular fluid reservoir, 9, extends between the outer wall of working cylinder 8 and the inner wall of outer cylinder 6. Rod guide 10 is maintained in contact with working cylinder 8 and outer cylinder 6 by means of closure cap 18 which is welded to outer cylinder 6 with knurled weld 22. Closure cap 18 is provided with a separate striker plate 20 which is welded to closure cap 18. Striker plate 20 is a cup-shaped member stamped from mild steel or the like. A disadvantage of the shock absorber shown in FIGS. 1 and 2 is that additional parts are needed to form the closure cap and striker plate. Also, the heat involved in welding the closure cap to the outer cylinder has been known to damage elastomeric seals used in the rod guide assembly. These seals must retain gas and liquid within the shock absorber, while excluding contaminants. The shock absorber shown in FIGS. 1 and 2 is attached to the vehicle by means of lower mounting bracket 26 having suitable holes therein for fixing the shock absorber to a suspension system or wheel spindle. The shock absorber is further provided with threaded fastener 28 which is integral with piston rod 2 and is further provided with spring perch 24 which is welded upon outer cylinder 6. Spring perch 24 is used for the purposes of seating a coil suspension spring (not shown). The shock absorber shown in FIGS. 1 and 2 is further provided with a jounce bumper 14 having a generally cylndrical configuration which is provided with a frustoconical lower segment 16 which contacts striker plate 20 when the strut is brought to the full jounce position. Thus, bumper 14 may be properly termed a jounce bumper.

Striker plate 20 is not welded to closure cap 18 continuously at their matched radii. Rather, an annular gap 30 is provided between the striker plate and closure cap so that any dirt or moisture accumulating on top of rod guide 10 wll not be forced through the rod guide when jounce bumper 14 moves into contact with the striker plate and compresses the air thereby trapped between the closure cap, striker plate, and jounce bumper.

FIGS. 3–7 illustrate formation of the unitary striker plate and closure cap of the present invention as applied to an automotive shock absorber.

Turning now to FIG. 3, piston rod 2 is slidably received by rod guide 10 which is equipped with a bearing sleeve 12 comprised of bronze impregnated with polytetrafluoroethylene or other suitable bearing material. The rod guide is positioned within outer cylinder 6 and face 10a of the rod guide is axially abutted and engaged with working cylinder 8. Rod seal 34 is provided immediately above rod guide and includes an annular seal ring 36 which positions the seal axially. Top wiper 38 and bottom wiper 40 prevent dirt, water, or other contaminants from moving along the rod and subsequently passing through the rod guide into the interior of the shock absorber. These wipers also provide a gas tight seal to maintain the working fluid and gas pressurization within the shock absorber. Bottom wiper 40 is held in contact with piston rod 2 by means of first garter spring 42. Rod seal 34 further comprises outer sealing lip 44 which maintains sealing contact between the rod guide and the inner wall of outer cylinder 6. The outer sealing lip further includes second garter spring 46 which maintains contact between the outer sealing lip and the outer diameter of rod guide 45. Annular ring 41, of steel, helps to maintain the shape of rod seal 34 and provides a solid abutment between seal ring 36 and the upper surface of rod guide 10.

Figure 4:
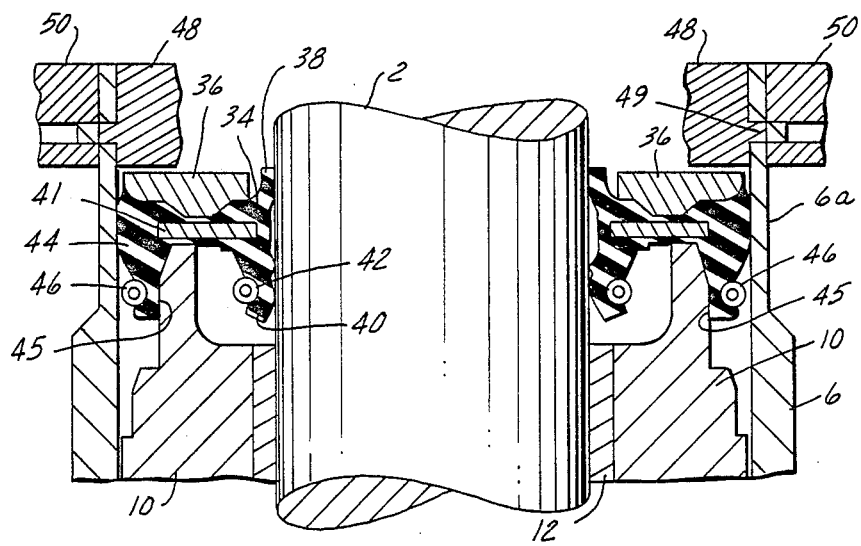

The first step in forming the unitary striker plate and closure cap of the present invention is shown sequentially in FIGS. 3 and 4. As shown in FIG. 3, male piercing die 48 and female piercing die 50 are brought into proximity of portion 6a of outer cylinder 6. As shown in FIG. 4, the piercing dies are brought together so as to form aperture 49 through outer cylinder wall 6a. Aperture 49 is shown in its final position in FIGS. 6 and 7. One or more apertures 49 may be formed and the function of these apertures is analogous to that of annular gap 30 described in connection with the prior art shock absorber illustrated in FIGS. 1 and 2, which freely allows the escape of any air pressure formed during a jounce contact between jounce bumper 14 and striker plate 20. As previously noted such air pressure could cause contamination of the interior of the shock absorber by forcing contaminants past the top and bottom wipers of rod guide seal 34. Apertures 49 prevent the harmful buildup of pressure between the jounce bumper and the striker plate, thereby preventing contamination.

Figure 5:
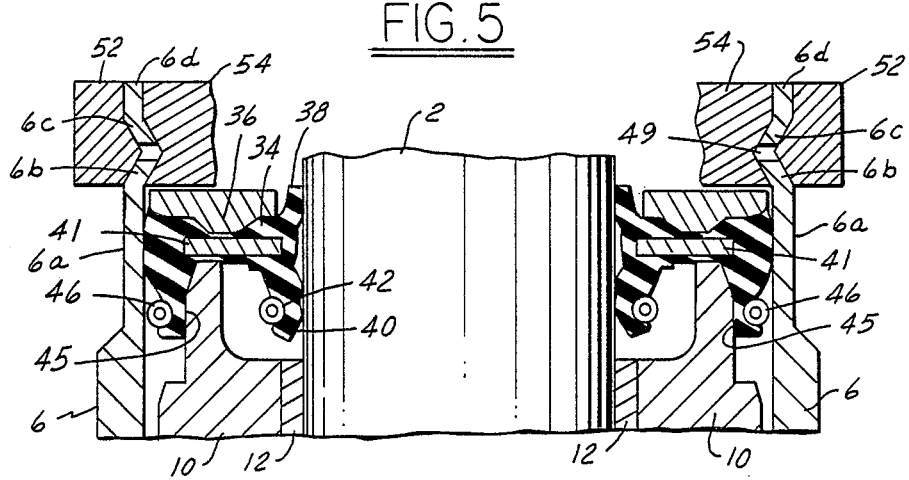

Turning now to FIG. 5, as shown in this Figure, male creasing die 52 and female creasing die 54 are brought together radially about outer cylinder wall 6a. During this operation axially adjoining segments 6b and 6c are radially displaced inwardly by the creasing action of dies 52 and 54. This step is of essential importance to the practice of the present invention because the preforming or creasing of the outer cylinder wall allows the cylinder wall to be axially deformed in a later process step in a controlled manner while at the same time using a cylinder component having a wall thickness which is not excessive. The present invention has been practiced using Society of Automotive Engineers (SAE) 1018 hot rolled steel formed as mandrel drawn steel tubing. It has further been found that outer cylinder wall thickness in the range of 2-2.5 millimeters produces a satisfactory result with the process of this invention. Although FIGS. 3-7 show the outer cylinder 6 as being of reduced thickness in the area of segment 6a-6b, this thickness reduction is not necessary to practice the invention and an integral closure cap and striker plate may be formed from a cylinder according to the present invention using hot rolled steel in the thickness range previously mentioned.

Figure 6:
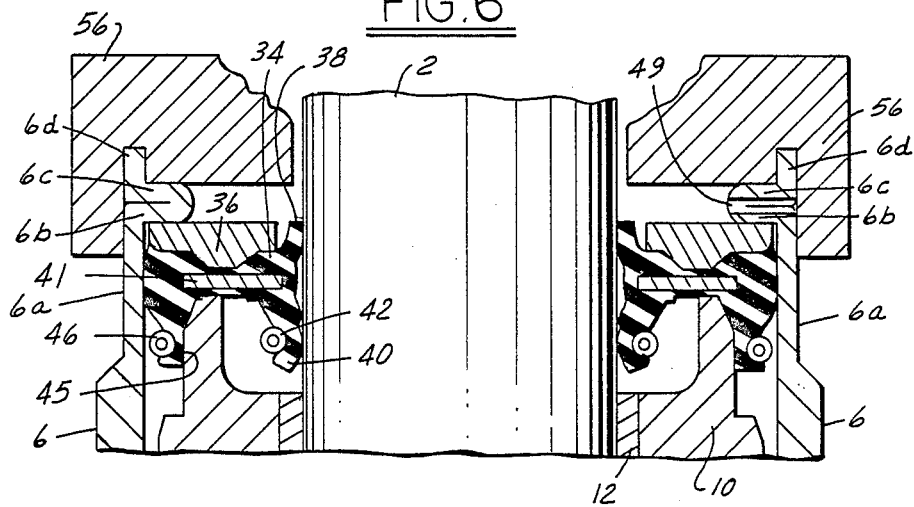
Figure 7:
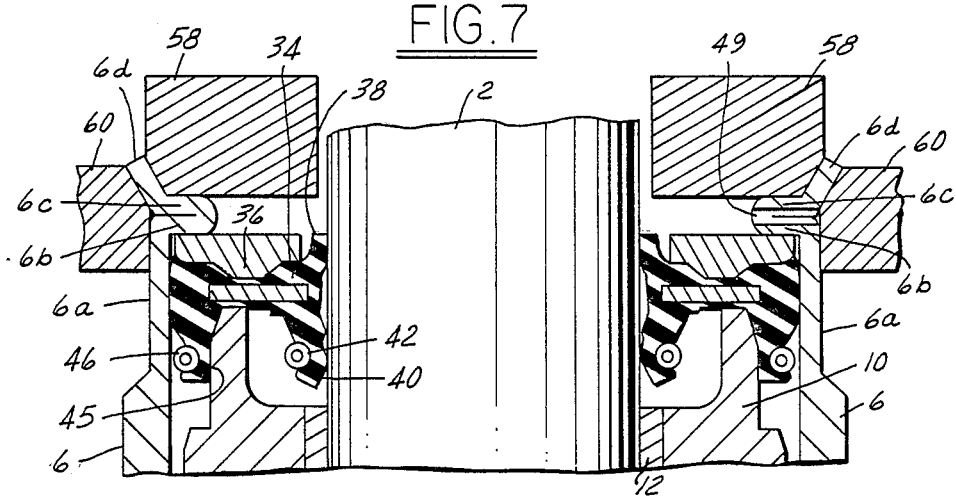

Turning now to FIG. 6, axial pressing die 56 is employed for the purpose of axially compressing the radially displaced segments 6b and 6c in order that segments 6b and 6c will abut each other to form an annular ring having a U-shaped cross section, as shown in FIGS. 6 and 7, with the annular ring extending radially inwardly from the outer periphery of the outer cylinder and abutting rod seal ring 36. As shown in FIG. 6, segments 6b and 6c are moved into a position wherein they are superimposed upon each other and formed to a tight bend radius over seal ring 36. It should be noted in this connection that it has been determined that segment 6c should be approximately 10-15 percent longer than segment 6b in order that the axial compression by pressing die 56 will produce the desired flat, U-shaped cross section annular ring. During the axial pressing operation, the strut is preferably supported by its end cap 27 as well as by a collar clamped at a convenient position about the strut in the region lying immediately below spring perch 24.

FIGS. 6 and 7 show aperture 49 in its final configuration. Each aperture extends through the cylinder wall in the region of segment 6b and 6c so as to provide relief for any pressure buildup above the rod seal when the strut is placed into the fully jounce position. Alternatively, one or more V-shaped grooves 51, shown in FIG. 8, may be provided in lieu of apertures 49. These grooves are V-shaped in cross section and are merely scored into a part of the interior wall surface of outer cylinder 6 prior to the forming operations.

FIG. 7 illustrates the formation of flared surface 6d as a final surface formed from outer cylinder 6. Flare 6d is formed by male flaring die 58 and female flaring die 60 which are brought together to radially displace outwardly segment 6d in the manner shown in FIG. 7. Flare 6d provides an engaging surface for the frustoconical segment 16 of jounce bumper 14 and thereby allows operation of the jounce bumper 14. Flare 6d also contains a portion of the jounce bumper when the bumper is in the full jounce position. The flaring operation may be employed to control the overall length of outer cylinder 6 because the extent to which segment 6d is flared directly affects the axial dimension of segment 6d. Accordingly, a fixed, repeatable dimension from the bottom of the shock absorber to the top of the flared segment is achievable. This is not possible with most prior art constructions. The ability to easily control the overall length of the shock absorber or MacPherson strut is particularly important with units such as that shown in FIGS. 1 and 2 and in the improved version in FIGS. 3-8, wherein the flared segment serves as a structure for limiting wheel travel in the rebound direction from extending beyond the full jounce position which may occur if jounce bumper 14 becomes worn excessively. Using the present invention, suspension designers may reliably predict maximum, metal to metal wheel travel which occurs when segment 6d touches the vehicle's body and this will materially aid the design process.

Unlike other constructions which provide only a single thickness of metal in the closure system over the rod guide and seal in a shock absorber or suspension strut, the present invention superimposes segments 6b and 6c over the rod guide so as to provide an economical but yet durable structure which is capable of functioning not only in a shock absorber but also in a suspension strut subjected to extreme loading when the suspension to which the strut is attached move to the full rebound position—i.e. that position which the strut is fully extended. Upon full extension of a suspension strut either the piston or a stop provided on the piston rod is brought up against the rod guide and this results in severe axial impact loading against the closure mechanism. This has, in the past, necessitated use of welded caps to prevent the closure mechanism from becoming detached during full rebound movement of the suspension. The integral closure cap and striker plate of the present invention provides a very secure retention structure for the rod guide because the double thickness annular ring is highly resistant to the conical deformation which accompanies undesired axial detachment of the rod guide. Stated another way, it has been determined that axial detachment of the rod guide, such as that which occurs during a failure of the shock absorber during a particularly severe rebound extension will be preceded by conical deformation of the closure cap. The double thickness, pressed annulus of the present invention resists this conical deformation because the thicknesses of material are highly resistant to bending and further because the work hardened section of material at the bight of the U-shaped cross section provides great resistance to bending.

The present closure procedure also provides a well defined radius on the inside surface which allows good closure for preventing leakage of strut fluid and gas pressurization inside the shock absorber.

The present invention provides a closure structure which is, as previously explained, integrally formed from the outer cylinder of the strut by the economical method illustrated herein. This method is economical for two reasons. First, the material needed to form the outer cylinder may be of reasonable thickness because the multi-step process employed with the present invention includes the creasing step which allows subsequent axial deformation to occur without causing buckling of the outer cylinder which would result from the excessive imposition of forces needed to produce the desired axial deformation in the absence of a previous creasing step. Thus, savings in terms of material results in practicing the present invention. Secondly, production time will be saved by the practice of the present invention because additional welding steps have been eliminated. Elimination of welding is beneficial for another reason because this obviates problems arising from the intense heat generated during welding, which has been found to damage piston rod seals.

FIGS. 9-11 disclose a second embodiment of the present invention in which a shock absorber suitable for use with an automotive bumper system has a rod guide assembled according to the present invention. This shock absorber includes mounting tube 80 at one end for attachment with automotive body structure or bumper and mounting bracket 82 at its other end which is welded to working cylinder 66. Working cylinder 66 is preferably filled with a high viscosity fluid such as gelled silicone. Piston 62, fitted within working cylinder 66 upon piston rod 68, includes shredder 65. The shredder and piston each have several large apertures to permit their movement through the gelled silicone when the shock absorber is compressed. Piston rod 68 slides through rod guide 74 which is attached to working cylinder 66. The piston rod abuts rod guide 70 which is held in place according to the present invention.

Turning now to FIG. 10, piston rod 68 has a rounded end 68a, which fits into a semi-hemispherical relieved area 70a formed in rod guide 70. Outer cylinder 72 is formed into a unitary closure cap for maintaining engagement of rod guide 70 with outer cylinder 72. This unitary closure cap comprises segments 72a and 72b of outer cylinder 72 and it is formed according to the method shown in FIGS. 5 and 6. Use of the present invention for this type of shock absober is economical because it eliminates welding of the rod guide to the outer cylinder thereby permitting more economical production processes.

A further illustration of the economy gained in the manufacturing of shock absorbers with the present invention is provided by the following example. A bumper shock absorber, generally constructed in accord with FIG. 9, but having a welded rod guide, 70, maintained within a cylinder of mild steel having a wall thickness of 0.095 inches, was subjected to axial force. It was found that 7000-9000 lbs. of force was required to detach the rod guide from the cylinder. However, when a second shock absorber having a reduced wall thickness of 0.065 inches, and having its rod guide 70 attached according to this invention was subjected to the same test, it was found that 12,000-14,000 lbs. of force was required to detach the rod guide. It is therefore possible to construct a shock absorber according to the present invention with lighter, less expensive materials, but with enhanced performance.

The second embodiment described herein illustrates use of the present invention to form a closure cap without a striker plate. This type of usage may be employed beneficially with conventional shock absorbers which are not macPherson structs.

Various modifications and variations will no doubt occur to those skilled in the various arts to which this invention pertains. For example, the particular processing sequence used in conjunction with the disclosed system may be varied. This and all other variations which basically rely on the teachings through which this disclosure has advanced the art are properly considered within the scope of this invention as defined by the appended claims.

We claim:

1. An automotive shock absorber comprising:
   a working cylinder;
   an outer cylinder mounted coaxially about said working cylinder;
   a piston rod attached to a piston slidably carried within said working cylinder;
   a rod guide engaged with said outer cylinder for locating said piston rod coaxially with said working and outer cylinders; and
   a unitary closure cap for maintaining the engagement of said rod guide with said outer cylinder, said closure cap comprising an annular ring formed from a full thickness section of said outer cylinder and extending radially inwardly from the outer periphery of said outer cylinder, with said annular ring having a U-shaped cross section oriented such that the legs of said U-shaped section lie generally perpendicular to the axis of said outer cylinder with the bight of the U-shaped section defining the innermost radius of said annular ring.

2. The shock absorber according to claim 1 wherein said rod guide has a bore therethrough allowing slidable passage of said piston rod.

3. The shock absorber according to claim 2 wherein said annular ring abuts said rod guide.

4. The shock absorber according to claim 2 wherein said closure cap further comprises a striker plate.

5. An automotive shock absorber comprising:
   a working cylinder;
   a piston rod slidably received into said working cylinder and having a piston seated thereon for slidable operation within said working cylinder;
   an outer cylinder mounted coaxially about said working cylinder and forming an annular fluid reservoir therewith;
   a rod guide fitted at least partially within said engaged with said working cylinder and said outer cylinder having a bore therethrough allowing passage of said piston rod into said working cylinder; and
   a unitary striker plate and closure cap comprising an annular ring formed from a full thickness section of said outer cylinder so as to abut said rod guide with said annular ring extending radially inwardly from the outer periphery of said outer cylinder and with said annular ring having a U-shaped cross section oriented such that the legs of said U-shaped section lie generally perpendicular to the axis of said outer cylinder with the bight of the U-shaped section defining the innermost radius of said annular ring.

6. The shock absorber according to claim 5 further comprising a jounce bumper mounted upon said piston rod.

7. The shock absorber according to claim 6 wherein said unitary striker plate and closure cap further comprises a generally cylindrical section extending from said annular ring for contacting and containing a portion of said jounce bumper when said shock absorber is in a full jounce position and further providing a structure for limiting wheel travel beyond the full jounce position.

8. The shock absorber according to claim 7 wherein said generally cylindrical section has a frustoconical shape with its least diameter adjoining said annular ring.

9. In an automotive shock absorber having a piston rod guide retained within an outer cylinder of said shock absorber, a method for forming a unitary striker plate and closure cap a full thickness section of said outer cylinder comprising the steps of:

radially displacing inwardly at least two axially adjoining segments of said outer cylinder; and axially compressing said radially displaced segments such that said segments abut each other to form an annular ring having a U-shaped cross section with said ring extending radially inwardly from the outer periphery of said outer cylinder and abutting said rod guide in such a manner that the bight of the U-shaped cross section defines the innermost radius of said annular ring.

10. The method according to claim 9 wherein said axially adjoining segments are displaced inwardly so as to initially leave an obtuse angle included between said segments prior to axially compressing said segments.

11. The method according to claim 9 further comprising the step of outwardly flaring an additional segment of said outer cylinder adjoining said annular ring, thereby providing a surface for contacting a jounce bumper carried upon the piston rod of said shock absorber.

12. The method according to claim 9 further comprising the step of piercing at least one aperture through said outer cylinder in such axial position that said aperture is positioned at the bight of said U-shaped annular ring after said axially adjoining segments have been axially compressed.

* * * * *